United States Patent
Kenney et al.

(10) Patent No.: US 10,445,943 B1
(45) Date of Patent: Oct. 15, 2019

(54) VIRTUAL REALITY BUNGEE TRAMPOLINE

(71) Applicant: Royal Caribbean Cruises Ltd., Miami, FL (US)

(72) Inventors: Amanda Kenney, Miami, FL (US); David Smith, Miami, FL (US)

(73) Assignee: ROYAL CARIBBEAN CRUISES LTD., Miami, FL (US)

( * ) Notice: Subject to any disclaimer, the term of this patent is extended or adjusted under 35 U.S.C. 154(b) by 0 days.

(21) Appl. No.: 16/135,130

(22) Filed: Sep. 19, 2018

(51) Int. Cl.
| | |
|---|---|
| *G06T 19/00* | (2011.01) |
| *G02B 27/01* | (2006.01) |
| *A63B 5/11* | (2006.01) |
| *A63B 5/16* | (2006.01) |

(52) U.S. Cl.
CPC .............. *G06T 19/006* (2013.01); *A63B 5/11* (2013.01); *A63B 5/16* (2013.01); *G02B 27/0172* (2013.01); *G06T 19/003* (2013.01); *A63B 2005/163* (2013.01)

(58) Field of Classification Search
CPC ....... G06T 19/006; G06T 19/003; A63B 5/16; A63B 5/11; A63B 2005/163; G02B 27/0172; A63F 13/847; A63F 13/35; G06F 3/0446; G06F 3/04815; G06F 3/011
See application file for complete search history.

(56) References Cited

U.S. PATENT DOCUMENTS

| | | | | |
|---|---|---|---|---|
| 2010/0240454 | A1* | 9/2010 | Xiao ...................... | A63G 21/20 463/30 |
| 2012/0309524 | A1* | 12/2012 | Rajaraman .......... | G07F 17/3206 463/31 |
| 2018/0021629 | A1* | 1/2018 | DeLuca ............. | A63B 24/0021 482/4 |
| 2018/0374264 | A1* | 12/2018 | Gatson .................. | G06T 19/006 |

\* cited by examiner

*Primary Examiner* — Chante E Harrison
(74) *Attorney, Agent, or Firm* — Steven M. Greenberg, Esq.; Ernesto Rubi, Esq.; Shutts & Bowen LLP

(57) ABSTRACT

Embodiments of the present invention provide a system, method and computer program product for a virtual reality bungee trampolining. In one embodiment, a virtual reality bungee trampolining system includes an enclosure, a trampoline disposed within the enclosure and a bungee fixture disposed between the trampoline and a ceiling of the enclosure. The system further includes a virtual reality headset coupled to a mobile computing system that has a wireless network adapter, at least one processor, memory and a display. Finally, the system includes a virtual reality experiential module disposed in the memory of the mobile computing system and executing by the at least one processor. The module includes computer program instructions enabled during execution to perform rendering a virtual reality environment in the display while the virtual reality headset is affixed to an end user harnessed to the bungee fixture over the trampoline.

11 Claims, 2 Drawing Sheets

VIRTUAL REALITY BUNGEE TRAMPOLINE

BACKGROUND OF THE INVENTION

Field of the Invention

The present invention relates to the field of virtual reality and more particular to virtual reality supported simulation.

Description of the Related Art

Virtual reality refers to the computerized display of a computer-generated environment imitating a corresponding real-world physical environment. In virtual reality, the computer-generated environment often provides a first-person viewpoint and is responsive to computer directed movements so that the first-person viewpoint presented in the computerized display changes according to the computer directed movements. Early forms of virtual reality required the end user to input the computer directed movements through a conventional computing system. But, more recent virtual reality systems incorporate human wearable or holdable sensors so that the movements are translated directly from the sensed movements of the human wearable or holdable sensors. Indeed, the most recent renditions of virtual reality rigs include a wearable headset such that the end user only perceives the imagery on a display of the headset without seeing any of the real, physical world. In this way, virtual reality has become an immersive experience.

Virtual reality has enabled ordinary individuals to experience extraordinary sensations such as scuba diving or sky diving without requiring individuals to actually scuba dive or skydive. One recent virtual reality system includes a smart phone adapted for use with a virtual reality headset. The virtual reality headset is then wirelessly linked to a remote display utilizing screen-casting such that an audio-visual display is presented in the virtual reality headset of a skydive. The end user wears the virtual reality headset and enters an indoor skydiving chamber while under the physical control of an instructor also present in the chamber. The instructor observes the screen-cast display and physically manipulates the end user while indoor skydiving to mimic the orientation of the end user shown in the screen-cast display. In this way, the end user receives a virtual reality experience of an actual skydive from high in the sky.

BRIEF SUMMARY OF THE INVENTION

Embodiments of the present invention address deficiencies of the art in respect to virtual reality experiential techniques and provide a novel and non-obvious system, method and computer program product for a virtual reality bungee trampolining. In an embodiment of the invention, a virtual reality bungee trampolining system includes an enclosure, such as a perforated dome or open air canopy, a trampoline disposed within the enclosure and a bungee fixture disposed between the trampoline and a ceiling of the enclosure. The system further includes a virtual reality headset coupled to a mobile computing system that has a wireless network adapter, at least one processor, memory and a display. Finally, the system includes a virtual reality experiential module disposed in the memory of the mobile computing system and executing by the at least one processor. The module includes computer program instructions enabled during execution to perform rendering a virtual reality environment in the display while the virtual reality headset is affixed to an end user harnessed to the bungee fixture over the trampoline.

In one aspect of the embodiment, at least one wireless access point is affixed to an interior wall of the enclosure, so that the computer program instructions during execution additionally maintain a wireless communicative link with the wireless access point affixed to the interior wall of the enclosure while the virtual reality headset is present within the enclosure and over the trampoline. As well, a monitor may be disposed externally to the enclosure and communicatively coupled to the at least one wireless access point, so as to display a screen cast of the virtual reality environment displayed in the display of the virtual reality headset concurrently with the display of the virtual reality environment in the virtual reality headset. Even further, an additional monitor may be disposed externally to the enclosure and communicatively coupled to a host computing server disposed externally to the enclosure, so as to display different virtual reality environments adapted for display in the virtual reality headset.

In another aspect of the embodiment, a wench is provided that selectively lengthens and shortens a bungee connecting the end user to the bungee fixture. In yet another aspect of the embodiment, the trampoline is an inflatable trampoline. To that end, in even yet another aspect of the embodiment, an additional three inflatable trampolines are disposed within the enclosure and an additional three bungee fixtures are placed within the enclosure, each over a respective one of the additional three inflatable trampolines.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for virtual reality bungee trampolining. In accordance with an embodiment of the invention, one or more trampolines are disposed within an enclosure, such as a dome or canopied area. An end user selects a virtual reality environment from a listing of available environments and enters the enclosure. The end user secures him or herself to a harness coupled to a bungee fixture by a bungee, steps onto one of the trampolines and dons a virtual reality headset programmed to render audio-visual content corresponding to the selected virtual reality environment. Thereafter, the bungee may be shortened, for instance through the operation of a wench, and the end user may proceed to bungee jump upon the trampoline within the enclosure. Optionally, the audio-visual content may be screen cast to a monitor disposed externally to the enclosure for viewing by one or more spectators. In this way, the end user may engage in a unique virtual reality experience enhanced by the physical sensations of trampolining and bungeeing.

Figure 1:
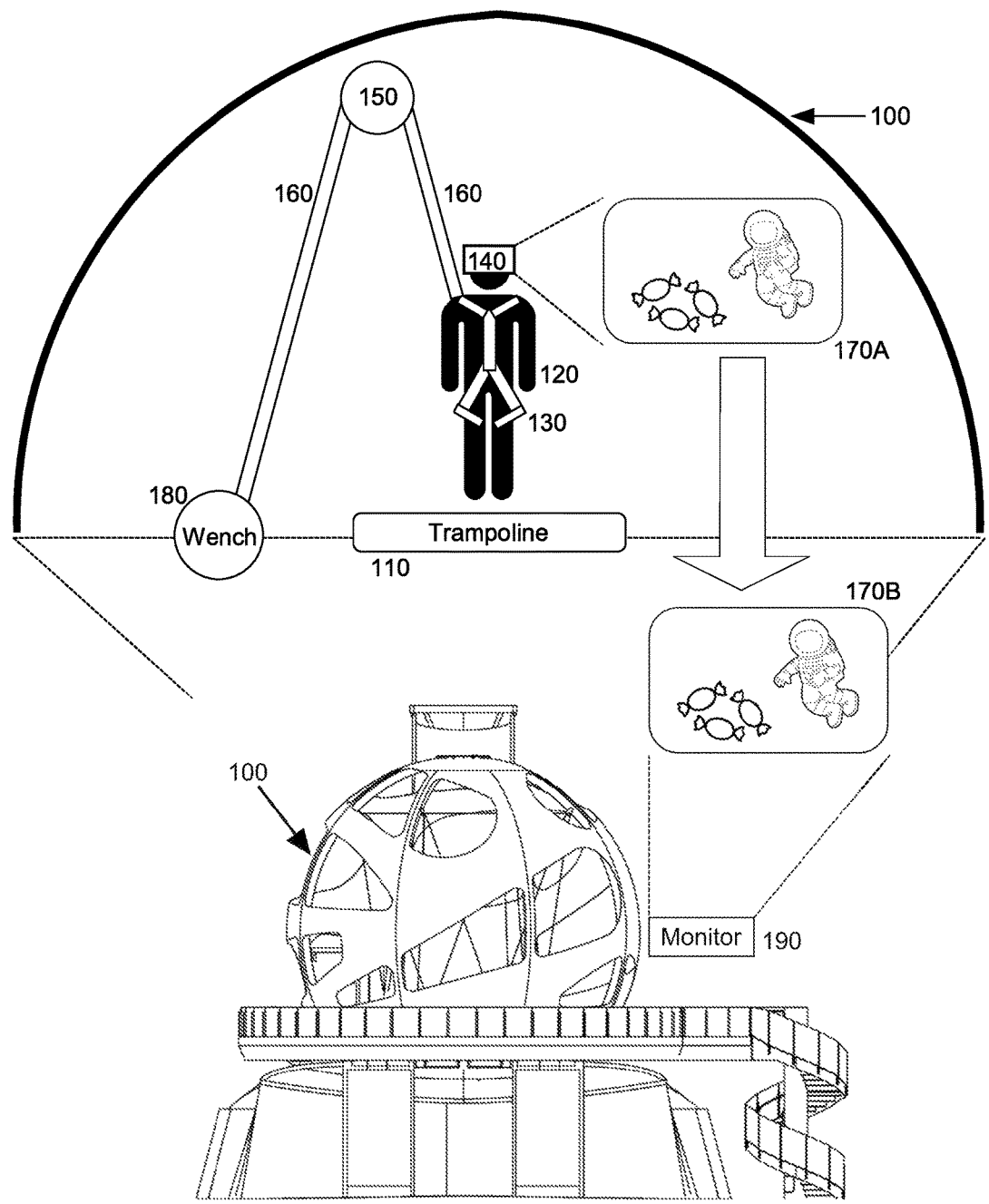
FIG. 1 is a pictorial illustration of a virtual reality bungee trampolining system.

In further illustration, FIG. 1 pictorially shows a virtual reality bungee trampolining system. As shown in FIG. 1, an enclosure 100 can be configured to include one or more trampolines 110, for instance a spring-loaded trampoline or an air-filled trampoline. The enclosure 100 also can be configured to include a bungeeing fixture 150, including a bungee 160 affixed to a harness 130 at one end, and an attachment point 180 at another end. In one aspect of the embodiment, the attachment point may include a wench 180 adapted to selectively lengthen and shorten the bungee 160 according to operator instruction.

An end user 120 may enter the enclosure 100 and secure him or herself to harness 130 and stand on a top surface of the trampoline 110. The end user 120 may don a virtual reality headset 140 through which a selected one 170A of different virtual reality experiences may be rendered for viewing by the end user 120 in a display of the virtual reality headset 140. More specifically, the virtual reality headset 140 may include a mobile computing device such as a smartphone, or embedded computer coupled to a display, either of which are integrated with a headset and a circumferential light shield to prevent the end user 120 for viewing anything other than that which is presented in the display. The virtual reality headset 140 also includes one or more position sensors sensing an orientation, attitude and movement of the end user 120 and feeding back resultant positioning data to the smartphone or embedded computer so as to cause the rendering of the selected one of 170A of the different virtual reality experiences to change relative to the movements of the end user 120.

To that end, the selected one 170A of the different virtual reality experiences provides a virtual reality view, for instance a view that is fanciful in nature such as one that virtually transports the end user 120 to another time, place, or planet including by way of example, a virtual environment wherein the end user 120 smashes candies in a sugar-coated world or a virtual environment wherein the end user travels light years into the future. Optionally, the selected one 170A of the different virtual reality experiences may be screen cast outside of the enclosure 100 to a monitor 190 such that spectators may view the same video imagery viewed as the end user 120.

Figure 2:
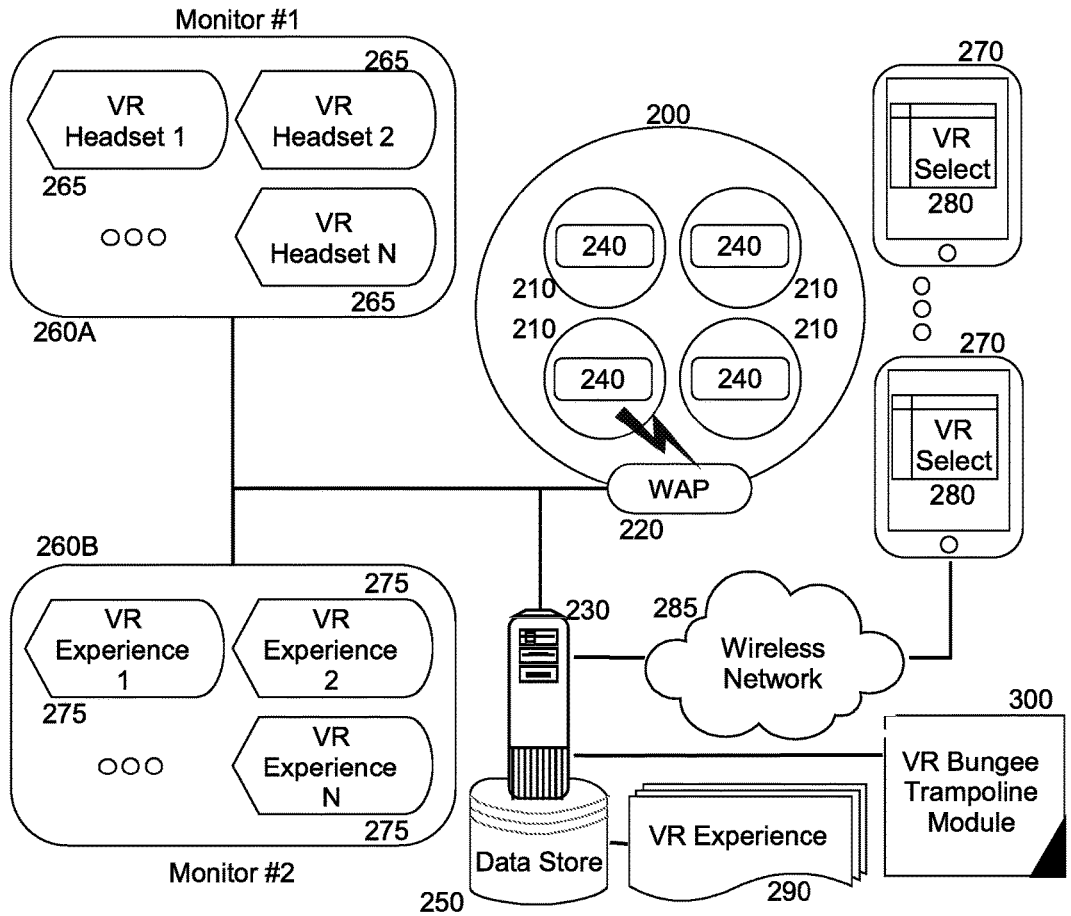
FIG. 2 is a schematic illustration of a data processing system adapted for virtual reality bungee trampolining; and, FIG. 3 is a flow chart illustrating a process for virtual reality bungee trampolining.

The arrangement illustrated in FIG. 1 may be implemented in connection with a data processing system. In yet further illustration, FIG. 2 schematically shows a data processing system adapted for virtual reality bungee trampolining. The system includes an enclosure 200 in which multiple different trampolines 210 are positioned along with corresponding bungeeing fixtures (not shown). A wireless access point 220 may be affixed to an interior surface of the enclosure 200 permitting wireless computer communications between different virtual reality headsets 240 disposed within the enclosure 200 and a host computing system 230 positioned externally to the enclosure 200.

The host computing system 230 includes one or more computers, each with memory and at least one processor and one or more different tablet computing devices 270 coupled to one another wirelessly over wireless computer communications network 285. The host computing system 230 is coupled to a data store 250 in which a repository of different virtual reality experiential visual content 290 is maintained. The different tablet computing devices 270 provide a selection user interface 280 enabling the selection amongst the different virtual reality experiential visual content 290 in connection with a specified one of the virtual reality headsets 240. To that end, the host computing system 230 also may be coupled to a monitor 260B positioned externally to the enclosure 220 through which a concurrent or sequential display 275 of the different virtual reality experiential visual content 290 may be presented to assist the end user in a selection.

Of note, a virtual reality bungeeing trampoline module 300 is disposed in the memory of the host computing system 230. The virtual reality bungeeing trampoline module 300 includes computer program instructions that when executed in the memory of the host computing system 230, are operable to receive a selection through the selection user interface 280 of a virtual reality experience from amongst the virtual reality experiential visual content 290. Thereafter, using a reference to the selection, the program instructions are enabled to retrieve a corresponding one of the selected virtual reality experiences 290 from the data store 250 and provide the selected one of the virtual reality experiences 290 to a specified one of the virtual reality headsets 240 for rendering while an end user wears the specified one of the virtual reality headsets 240 whilst positioned on a corresponding one of the trampolines 210 and harness to a corresponding one of the bungeeing fixtures (not shown) within the enclosure 200.

Optionally, once the selected one of the virtual reality experiences 290 is loaded for rendering in the specified one of the virtual reality headsets 240, program instructions may direct the establishment between the specified one of the virtual reality headsets 240 and the wireless access point 220 of a communicative link. As such, utilizing the communicative link, the program instructions may screen cast the rendering of the selected one of the virtual reality experiences 290 to another monitor 260, also disposed externally to the enclosure 200 so that the monitor 260 displays concurrently or sequentially, different screen casts 265 of different ones of the virtual reality experiences 290 rendered in corresponding ones of the virtual reality headsets 240 positioned within the enclosure 200.

Figure 3:
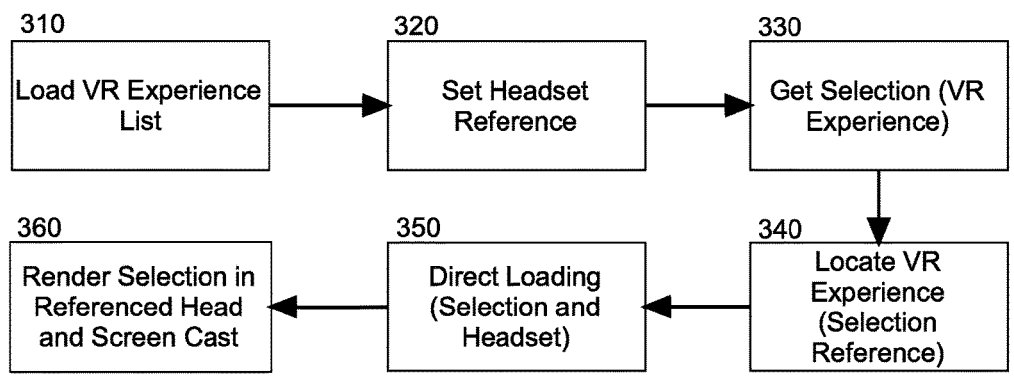

In even yet further illustration of the operation of the virtual reality bungeeing trampoline module 300, FIG. 3 is a flow chart illustrating a process for virtual reality bungee trampolining. Beginning in block 310, a list of virtual reality experiences available for selection by end users are loaded into memory and displayed in a selection user interface of a tablet computer. As well, in block 320, a reference to a specific headset is established through the selection user interface. Then, in block 330, a selection of one of the virtual reality experiences is received in the selection user interface and in block 340, the selected virtual reality experience is located in fixed storage. In block 350, the located virtual reality experience is directed for loading in the specified virtual reality headset. Finally, in block 360, the selected virtual reality experience, once loaded, is rendered in a display of the specified headset and screen cast to the external monitor.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A virtual reality bungee trampolining system comprising:
   an enclosure;
   a trampoline disposed within the enclosure;
   a bungee fixture disposed between the trampoline and a ceiling of the enclosure;
   a virtual reality headset coupled to a mobile computing system comprising a wireless network adapter, at least one processor, memory and a display;
   a virtual reality experiential module disposed in the memory of the mobile computing system and executing by the at least one processor, the module comprising computer program instructions enabled during execution to perform rendering a virtual reality environment in the display while the virtual reality headset is affixed to an end user harnessed to the bungee fixture over the trampoline;
   at least one wireless access point affixed to an interior wall of the enclosure, the computer program instructions during execution additionally maintaining a wireless communicative link with the wireless access point affixed to the interior wall of the enclosure while the virtual reality headset is present within the enclosure and over the trampoline;
   a monitor disposed externally to the enclosure, communicatively coupled to the at least one wireless access point, and displaying a screen cast of the virtual reality environment displayed in the display of the virtual reality headset concurrently with the display of the virtual reality environment in the virtual reality headset; and, an additional monitor disposed externally to the enclosure, communicatively coupled to a host computing server disposed externally to the enclosure and displaying different virtual reality environments adapted for display in the virtual reality headset.

2. The system of claim 1, further comprising a wench selectively lengthening and shortening a bungee connecting the end user to the bungee fixture.

3. The system of claim 1, wherein the trampoline is an inflatable trampoline.

4. The system of claim 3, wherein an additional three inflatable trampolines are disposed within the enclosure and an additional three bungee fixtures are placed within the enclosure, each over a respective one of the additional three inflatable trampolines.

5. A method for virtual reality bungee trampolining system comprising:

selecting amongst a multiplicity of virtual reality environments, a particular one of the virtual reality environments;

transmitting to a virtual reality headset, a reference to the particular one of the virtual reality environments;

rendering in a display of the virtual reality headset, the particular one of the virtual reality environments while the virtual reality headset is affixed to an end user harnessed to a bungee fixture over a trampoline disposed within an enclosure;

screen casting concurrently with the rendering a screen casted form of the virtual reality environments in a monitor disposed externally to the enclosure;

additionally maintaining a wireless communicative link with a wireless access point affixed to the interior wall of the enclosure while the virtual reality headset is present within the enclosure and over the trampoline; and, displaying in an additional monitor disposed externally to the enclosure, different virtual reality environments adapted for display in the virtual reality headset.

6. The method of claim 5, further comprising selectively shortening a bungee connecting the end user to the bungee fixture.

7. The method of claim 5, wherein the trampoline is an inflatable trampoline.

8. The method of claim 7, wherein an additional three inflatable trampolines are disposed within the enclosure and an additional three bungee fixtures are placed within the enclosure, each over a respective one of the additional three inflatable trampolines.

9. The computer program product of claim 7, wherein an additional three inflatable trampolines are disposed within the enclosure and an additional three bungee fixtures are placed within the enclosure, each over a respective one of the additional three inflatable trampolines.

10. The computer program product of claim 5, wherein the trampoline is an inflatable trampoline.

11. A computer program product for virtual reality bungee trampolining, the computer program product including a computer readable storage medium having program instructions embodied therewith, the program instructions executable by a device to cause the device to perform:

selecting amongst a multiplicity of virtual reality environments, a particular one of the virtual reality environments;

transmitting to a virtual reality headset, a reference to the particular one of the virtual reality environments;

rendering in a display of the virtual reality headset, the particular one of the virtual reality environments while the virtual reality headset is affixed to an end user harnessed to a bungee fixture over a trampoline disposed within an enclosure;

screen casting concurrently with the rendering a screen casted form of the virtual reality environments in a monitor disposed externally to the enclosure;

additionally maintaining a wireless communicative link with a wireless access point affixed to the interior wall of the enclosure while the virtual reality headset is present within the enclosure and over the trampoline; and, displaying in an additional monitor disposed externally to the enclosure, different virtual reality environments adapted for display in the virtual reality headset.

\* \* \* \* \*